Nov. 12, 1940.    D. ALLISON    2,221,437
FISHING FLOAT
Filed May 27, 1939
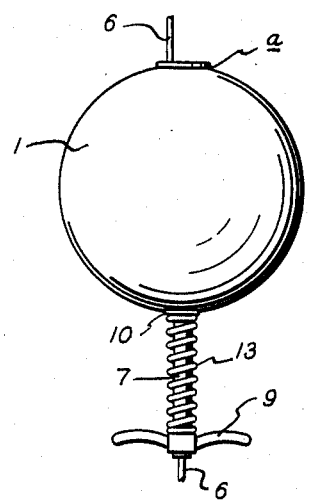
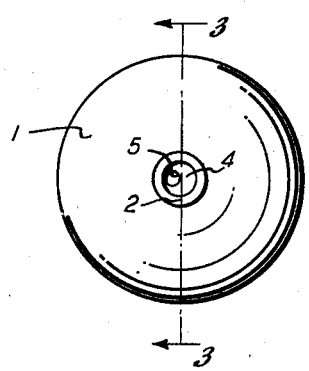
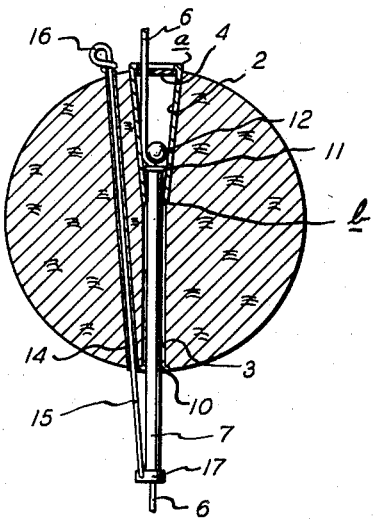
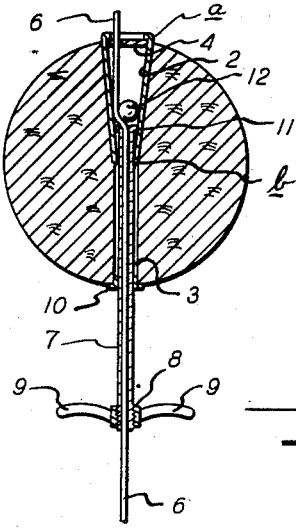
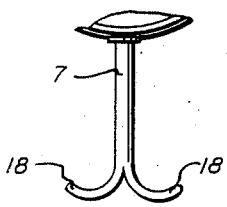
Douglas Allison
INVENTOR
BY Cecil L. Flood
ATTORNEY Patented Nov. 12, 1940

2,221,437

UNITED STATES PATENT OFFICE 2,221,437

FISHING FLOAT

Douglas Allison, Fort Worth, Tex., assignor to Karl K. Elliott, Los Angeles, Calif.

Application May 27, 1939, Serial No. 276,098

6 Claims. (Cl. 43—49)

This invention relates to fishing floats and has particular reference to a device of this character which is capable of automatically clamping and releasing the fishing line so as to be practicable in the reeling in of line where the fishing depth is greater than the length of the rod used as well as for the expeditious adjustment of the float under any circumstances.

The primary object of the invention resides in the provision of a fishing float having an automatic clamping device forming a part thereof which is infallible in its operation.

Another object is in the provision of an arrangement whereby the float may be released from the line by manual manipulation without inverting or otherwise entailing clumsy handling.

Broadly, the invention seeks to comprehend the provision of a fishing float capable of automatic adjustment on a fishing line which is infallible in its operation as well as being simple and economical in its construction.

Other and lesser objects will become manifest as the description proceeds taken in connection with the accompanying drawing wherein:

Figure 1 is an elevational view of one form of the invention.

Figure 2 is a plan view of Figure 1.

Figure 3 is a vertical sectional view of a form of the invention similar to that illustrated in Figure 1, taken on line 3—3 of Figure 2, but in which the spring is eliminated.

Figure 4 is a vertical sectional view of a modified form of the invention, and

Figure 5 is a modified form of the ball operating stem which may be employed in the construction illustrated in the other figures.

Continuing with a more detailed description of the drawing, the numeral 1 generally designates a float or body which may be of any desired shape and has a tapered tube 2 therein as illustrated in Figures 3 and 4.

The large end $a$ of the tube 2 terminates near the upper surface of the body 1, whereas the small end $b$ terminates within the body 1 in a bore 3 which is in axial alignment with the tube and extends through the under side of the said body.

The upper end $a$ of the tube 2 is crimped inwardly and secures therein a disc 4. This disc 4 has an aperture 5 at one side of its center which is of sufficient diameter to slidably receive a fishing line 6.

Within the passageway or bore 3 and the lower end $b$ of the tube 2, there is provided a slidable hollow stem 7 which extends outwardly from the body 1 and has threads 8 at its outer end to receive a relatively small handle 9, as illustrated in Figures 1 and 3.

At the outer end of the passageway 3 there is pressed, or otherwise positioned, an eyelet 10 for slidably engaging the stem, thus insuring slidability and providing a guide for the latter.

To prevent the stem 7 from becoming disengaged, the end within the tube 2 is made with an outwardly extending flange 11 which is slightly larger than the internal diameter of the small end $b$ of the tube 2. In constructing the device it is obviously expedient to insert the stem 7 through the large end $a$ of the tube 2 before the disc 4 is secured in place.

Within the tube 2, and between the disc 4 and flange 11, there is provided a ball 12 for free movement, the diameter of which is approximately the same as that of the flange.

The construction, thus far described, is capable of receiving the line 6 through the disc 4, the tube 2, around the ball 12 and outwardly through the stem 7.

Thus, a downward movement of the line 6, relative to the body 1, will cause the ball 12 to engage the line against the inner wall of the tapered tube 2, thereby clamping the device and determining the fishing depth.

Conversely, an upward force exerted on the line 6, relative to the body 1, will cause the device to become disengaged, this last operation being best exemplified by the reeling in of line and the contact of the body 1 against the end of a fishing rod.

However, under certain circumstances, disengagement may be desired other than by contacting the float 1 against the rod. To accomplish this last purpose, the stem may be manually operated toward the disc 4 thereby releasing the ball 12 from contact with the line 6. The handle 9 is of particular advantage in operating the ball 12 when the stem 7 is wet since the latter, by reason of its design, would otherwise be difficult to grasp.

The invention may be constructed with an expansion spring 13 disposed over the stem 7 between the eyelet 10 and the handle 9 as illustrated in Figure 1, thereby maintaining the ball 12 in position to engage the line 6 except when acted upon by a force through the handle 9 or the outer end of the stem 7.

However, the form of the invention illustrated in Figure 3 will operate satisfactorily without the spring 13, but when so used the engagement of the stem 7 with the lower end $b$ of the tube 2 and the eyelet 10 must be loose and nearly frictionless.

Another form of the invention, illustrated in Figure 4, differs from the form illustrated in Figure 3 in the provision of an arrangement whereby the stem 7 and the ball 12 may be operated without removing the float 1 from the water. To accomplish this operation a tube 14 is provided through the body 1 in close proximity to the tapered tube 2 and the communication 3, and has a flexible wire 15 or the like arranged therethrough. The upper end of the flexible wire 15 terminates in an eyelet 16 for attaching an auxiliary line or other means of lifting the said wire. The lower end of the stem 7 is provided with a collar 17 to which the lower end of the wire may be attached. By this arrangement the ball 12 may be made to release the line 6. The weight or sinker will cause the line 6 to continue downwardly until the operator releases the wire 15, thereby causing the line 6 to again be engaged and at the desired position.

Another modification, illustrated in Figure 5, provides a construction of the stem 7 in which handles 18 are formed by splitting or dividing the outer end of the stem and bending the same outwardly.

Manifestly, the structure herein shown and described is capable of considerable changes and modifications from time to time by those skilled in the art, and such changes and modifications as may be resorted to which fall within the spirit and intent of the invention may also be considered as falling within the scope of the appended claims.

What is claimed is:

1. A float for a fishing line comprising a body, a tapered tube disposed in the said body, a freely movable ball within the said tube, means retaining the said ball within the said tube, a hollow stem slidably disposed within the said tapered tube and extending through and outwardly from the said body, and means attached to the bottom of the said stem for raising the said ball in the said tube.

2. A fishing float comprising a body, a tapered tube in said body, a ball in the said tube for engaging a fishing line, a hollow stem slidably engaged within the smaller end of the said tube and extending outwardly from the said body for operating the said ball.

3. A fishing float comprising a body, a tapered tube in said body, a ball in the tube for engaging a fishing line, a hollow stem slidably engaged within the said body, the upper end of said stem terminating within the said tapered tube, and an outwardly extending flange forming a part of the said upper end.

4. In a fishing float, a body, a tapered tube disposed within the said body, a freely movable ball within the said tube, a hollow stem slidably disposed within the small end of the tapered tube and extending outwardly through the said body, means retaining the said stem within the said tube and a handle secured to the outer end of the said stem for manipulating the ball in the said tube by the said stem.

5. A fishing float comprising a body, a tapered tube in said body, a ball in the tube for engaging a fishing line, a hollow stem slidably engaged within the smaller end of the said tube and extending outwardly from the said body for operating the said ball, and means arranged on the lower end of the said stem for manipulating the said ball.

6. A float for a fishing line comprising a body, a tapered tube disposed in the said body, a freely movable ball within the said tube, means retaining the said ball within the said tube, a hollow stem slidably engaged within the said tapered tube and extending outwardly from the said body, another tube arranged through the said body and situated near the first named tube, a flexible wire slidably disposed within the last named tube, and means connecting the said wire with the outer end of the said stem.

DOUGLAS ALLISON.